US00RE48493E

(19) United States
(12) Reissued Patent
Sasaoka et al.

(10) Patent Number: US RE48,493 E
(45) Date of Reissued Patent: Mar. 30, 2021

(54) DISPLAY DEVICE

(71) Applicant: Funai Electric Co., Ltd., Osaka (JP)

(72) Inventors: Hiromasa Sasaoka, Osaka (JP); Noritaka Tanabe, Osaka (JP); Naoki Nitanai, Osaka (JP)

(73) Assignee: FUNAI ELECTRIC CO., LTD., Osaka (JP)

(21) Appl. No.: 16/257,885

(22) Filed: Jan. 25, 2019

Related U.S. Patent Documents

Reissue of:
(64) Patent No.: 10,007,147
Issued: Jun. 26, 2018
Appl. No.: 15/332,384
Filed: Oct. 24, 2016

(30) Foreign Application Priority Data

Oct. 26, 2015 (JP) ..... JP2015-210164

(51) Int. Cl.
*G02F 1/1335* (2006.01)
*G02F 1/1333* (2006.01)
*G02F 1/13357* (2006.01)

(52) U.S. Cl.
CPC .. *G02F 1/133605* (2013.01); *G02F 1/133603* (2013.01); *G02F 1/133608* (2013.01);
(Continued)

(58) Field of Classification Search
CPC ..... G02F 1/133605; G02F 1/133603; G02F 1/133608; G02F 1/133611;
(Continued)

(56) References Cited

U.S. PATENT DOCUMENTS 7,901,099 B2 * 3/2011 Namiki ..... G02F 1/133608 362/217.14
2007/0103908 A1 * 5/2007 Tabito ..... G02F 1/133608 362/294

(Continued)

FOREIGN PATENT DOCUMENTS

CN 102439354 A 5/2012
EP 2 790 055 A1 10/2014

(Continued)

OTHER PUBLICATIONS

The European Search Report of the corresponding European Application No. 19150370.5, dated Feb. 11, 2019.

(Continued)

*Primary Examiner* — Ling X Xu
(74) *Attorney, Agent, or Firm* — Global IP Counselors, LLP

(57) ABSTRACT

A display device comprises a display component, a light source, an optical element, and a first reflective member. The optical element is positioned in a light emission direction from the light source. The first reflective member is positioned rearward of the display component. The first reflective member includes a first opening and a second opening that is continuous with the first opening and in which the light source is positioned. A width of the optical element is smaller than a width of the first opening and is larger than a width of the second opening in a first direction.

34 Claims, 10 Drawing Sheets

(52) U.S. Cl.
CPC .. *G02F 1/133322* (2021.01); *G02F 1/133325* (2021.01); *G02F 1/133607* (2021.01); *G02F 1/133611* (2013.01)

(58) Field of Classification Search
CPC ..... G02F 2001/133322; G02F 2001/133325; G02F 2001/133607
See application file for complete search history.

(56) References Cited

U.S. PATENT DOCUMENTS

| | | | | |
|---|---|---|---|---|
| 2009/0135583 | A1* | 5/2009 | Hillman | G02F 1/133603 362/97.1 |
| 2010/0008066 | A1* | 1/2010 | Moro | G02F 1/133608 362/97.1 |
| 2012/0063133 | A1 | 3/2012 | Takeuchi et al. | |
| 2012/0105764 | A1 | 5/2012 | Yokota | |

FOREIGN PATENT DOCUMENTS

| | | | |
|---|---|---|---|
| JP | 2011-28991 | A | 2/2011 |
| JP | 2012-204336 | A | 10/2012 |

OTHER PUBLICATIONS

Extended European Search Report of the corresponding European Application No. 16 195 544.8, dated Mar. 1, 2017.

* cited by examiner (COMPARATIVE EXAMPLE)

(SECOND EMBODIMENT)

(THIRD EMBODIMENT)

(MODIFICATION EXAMPLE OF SECOND EMBODIMENT)

DISPLAY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a Reissue application of U.S. patent application Ser. No. 15/332,384 filed on Oct. 24, 2016, now U.S. Pat. No. 10,007,147 issued on Jun. 26, 2018, which* claims priority to Japanese Patent Application No. 2015-210164 filed on Oct. 26, 2015. The entire disclosure of Japanese Patent Application No. 2015-210164 is hereby incorporated herein by reference.

BACKGROUND

Field of the Invention

The present invention relates to a display device. More specifically, the present invention relates to a display device having a light source and a reflective member.

Background Information

Display devices comprising a light source and a reflective member are known in the art (see Japanese Unexamined Patent Application Publication No. 2012-204336 (Patent Literature 1), for example).

Patent Literature 1 discloses a directly backlit display device comprising a display component, a light source, a lens member attached to the top face (display face side) of the light source, a support member that supports the light source, and a reflective sheet (reflective member) that is disposed between the lens member and the support member. The reflective sheet has an opening that matches the size of the light source, and the light source is disposed on the inside of the opening. The external size of the lens member is larger than the opening. Accordingly, a reflective sheet is also disposed directly under the lens member (on the support member side). Consequently, light emitted directly under the lens member will be reflected by the reflective sheet, so this suppresses a decrease in the light utilization efficiency. With the display device in Patent Literature 1, it is believed that after the light source is installed on the support member, the reflective sheet is installed on the support member so that the light source will be located inside the opening, after which the lens member is attached to the light source.

SUMMARY

However, with the display device in Patent Literature 1, when a plurality of light sources are provided, a problem is that the lens member has to be attached individually to each of the light sources after the light sources and the reflective sheet have been installed on the support member. This complicates the assembly work.

One object of the present invention to provide a display device with which assembly work is made easier. Another object of the present invention is to suppress a decrease in the light utilization efficiency.

In view of the state of the known technology and in accordance with a first aspect of the present invention, a display device is provided that comprises a display component, a light source, an optical element, and a first reflective member. The optical element is positioned in a light emission direction from the light source. The first reflective member is positioned rearward of the display component. The first reflective member includes a first opening and a second opening that is continuous with the first opening and in which the light source is positioned. A width of the optical element is smaller than a width of the first opening and is larger than a width of the second opening in a first direction.

Also other objects, features, aspects and advantages of the present disclosure will become apparent to those skilled in the art from the following detailed description, which, taken in conjunction with the annexed drawings, discloses one embodiment of the display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Configuration of Display Device

The configuration of a liquid crystal television set 100 pertaining to a first embodiment will now be described through reference to FIGS. 1 to 7. The liquid crystal television set 100 is an example of the "display device" in the present disclosure.

Figure 1:
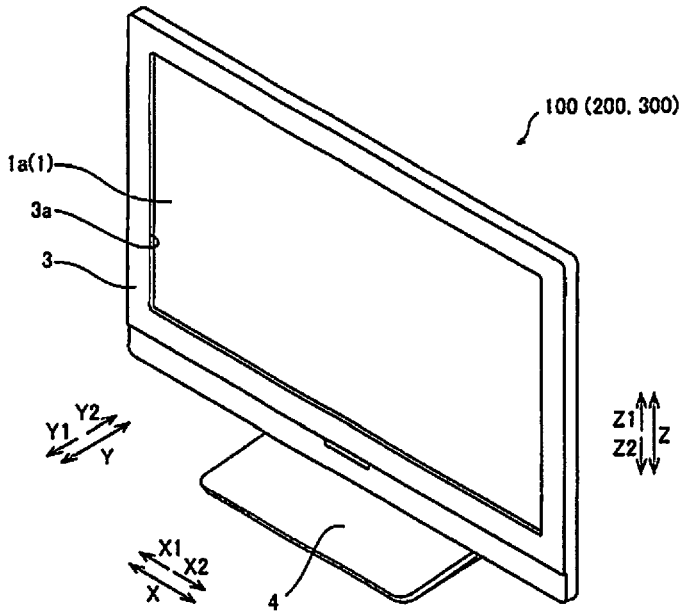
FIG. 1 is an perspective view of the overall configuration of a liquid crystal television set in accordance with a first embodiment.

As shown in FIG. 1, the liquid crystal television set 100 pertaining to the first embodiment is provided with a display component 1. The display component 1 has a display face 1a. The display component 1 is mainly composed of liquid crystal cells, and displays an image. In the description that follows, as viewed from a position opposite the display component 1 of the liquid crystal television set 100, the left direction will be referred to as the arrow X1 direction, the right direction as the arrow X2 direction, the front direction as the arrow Y1 direction, the rear direction (or back face direction) as the arrow Y2 direction, the up direction as the arrow Z1 direction, and the down direction as the arrow Z2 direction.

The liquid crystal television set 100 is configured as a directly backlit liquid crystal display device that displays an image on the display component 1, using a light source 2 (see FIG. 3) provided on the arrow Y2 direction side relative to the display component 1 as a backlight.

Figure 2:
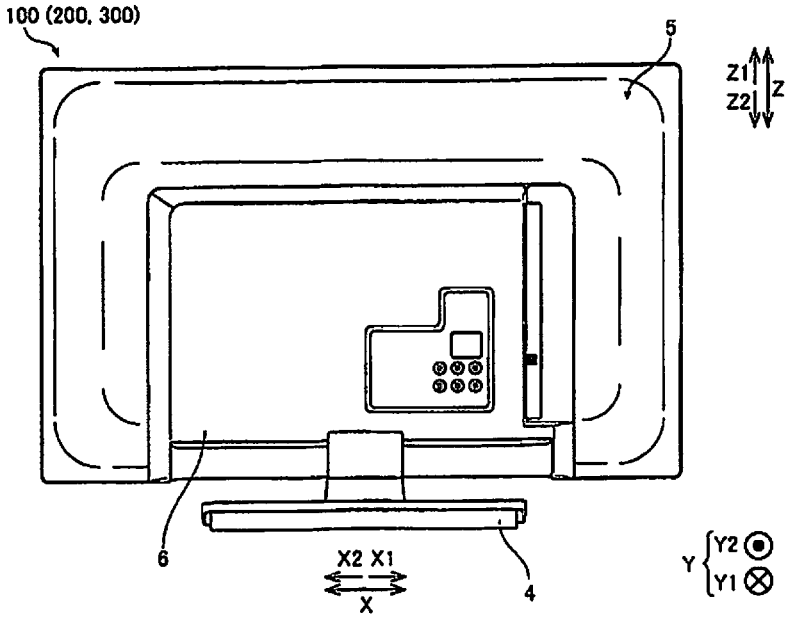
FIG. 2 is a rear elevational view of the overall configuration of the liquid crystal television set in accordance with the first embodiment.

As shown in FIGS. 1 and 2, the liquid crystal television set 100 includes a front housing 3, a stand member 4, a rear frame 5, and a cover member 6. The rear frame 5 is an example of the "support member" in the present disclosure. The rear frame 5 supports the light source 2.

The front housing 3 is molded from plastic, for example, or any suitable material as used in the art. The front housing 3 supports the display component 1 from the front face side (one face side in the arrow Y1 direction). A rectangular opening 3a for exposing the display face of the display component 1 on the arrow Y1 direction side is provided in the center of the front housing 3.

The stand member 4 is molded from plastic, for example, or any suitable material as used in the art. The stand member 4 supports the entire liquid crystal television set 100 from below (the arrow Z2 direction side).

The rear frame 5 supports the display component 1 from the rear (or from the back face side or the other face side in the arrow Y2 direction). The rear frame 5 is formed from metal, for example, or any suitable material as used in the art. The rear frame 5 is formed in a concave shape that is recessed in the arrow Y2 direction. The rear frame 5 is put together with the front housing 3 from the arrow Y2 direction side. The rear frame 5 also supports the light source 2.

The cover member 6 is molded from plastic, for example, or any suitable material as known in the art. The cover member 6 is formed in a size that is smaller than the rear frame 5, as shown in FIG. 2. The cover member 6 is disposed on the rear face side or back face side of the rear frame 5 (the arrow Y2 direction side). The cover member 6 partially covers part of the rear face or back face of the rear frame 5 (the face on the arrow Y2 direction side). The cover member 6 covers various boards (not shown), such as a signal processing board and a power supply board disposed on the rear face of the rear frame 5. The cover member 6 is fixed to the rear frame 5.

Figure 3:
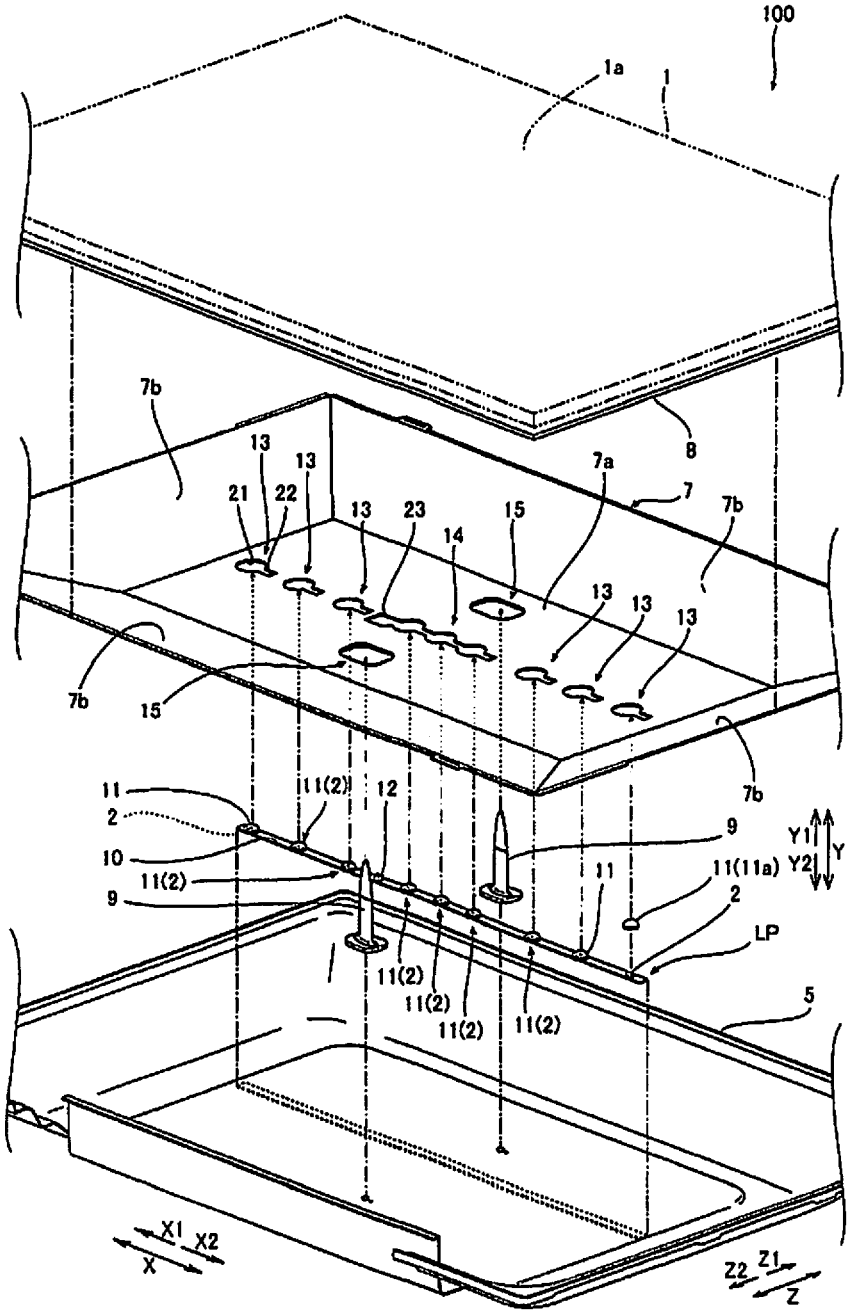
FIG. 3 is an exploded perspective view of the liquid crystal television set in accordance with the first embodiment.

As shown in FIG. 3, the liquid crystal television set 100 includes a light source component LP, a first reflective member 7, an optical sheet 8, and panel posts 9. The light source component LP includes a plurality of the light sources 2, a board 10, a plurality of lens members 11, and a connector 12. The board 10 is an example of the "wiring board" in the present disclosure. The shapes of the various components in the plan view as seen from the display component 1 side, will be described below. "Plan view as seen from the display component 1 side" refers to a view in the Y direction from the display component 1 side. Therefore, the shape as seen in the plan view from the display component 1 side (the plan view shape) indicates the shape or dimensions in directions (i.e., Z direction and X direction) that are parallel to the display face 1a of the display component 1.

The light source component LP is configured as a light source module in which a plurality of the light sources 2, a plurality of the lens members 11, and the connector 12 are mounted on the board 10. Thus, the liquid crystal television set 100 is provided with a plurality of each of the light sources 2 and the lens members 11. In other words, the light sources 2 and the lens members 11 are provided in a plural number, respectively. The light source component LP is fixed to the rear frame 5. The light source component LP emits light over the entire surface of the display component 1 from the rear face side or the back face side of the display component 1. The fixing of the light source component LP is accomplished by fixing the board 10 to the rear frame 5 by using double-sided adhesive, heat-dispersing tape, fastening screws, or any other suitable method as known in the art. In the first embodiment, just one light source component LP is provided. However, the number of the light source components LP can be different as needed and/or desired.

The light sources 2 includes LEDs (light emitting diodes). That is, in the illustrated embodiment, the light sources 2 are point light sources. The light sources 2 are disposed on the rear face side or the back face side of the display component 1 (the arrow Y2 direction side). The light sources 2 emit light to the display component 1 side (the arrow Y1 direction side). The light sources 2 are supported on the rear frame 5 via the board 10. The light sources 2 have a rectangular shape in the plan view (see FIG. 5).

The board 10 is a wiring board having a slender shape that extends in a straight line. The board 10 is installed on the front face surface of the rear frame 5 (the surface on the arrow Y1 direction side). Also, a total of nine light sources 2 and the connector 12 are mounted on the front face surface of the board 10, spaced apart and running in the direction in which the board 10 extends (the X direction).

Figure 7:
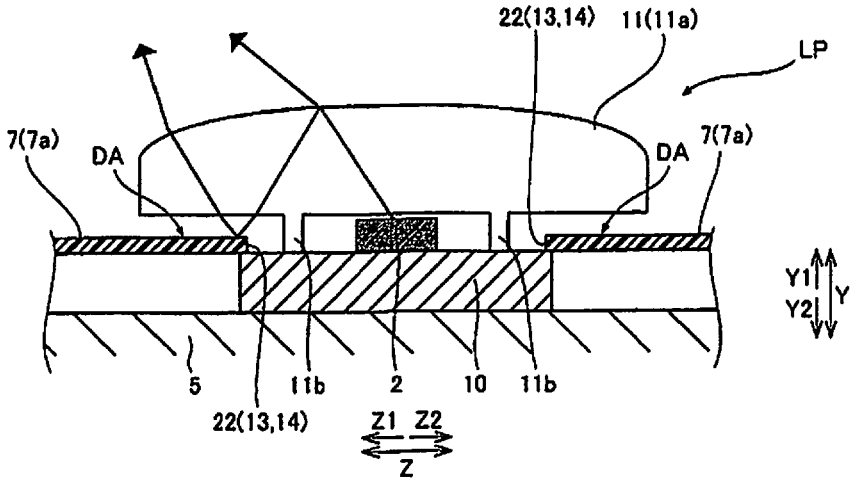
FIG. 7 is a partial cross-sectional view showing a cross section passing through the light source in FIG. 6.

The lens members 11 are installed on the display component 1 side of the light sources 2. The lens members 11 cover the light sources 2 that are mounted on the board 10, from the display component 1 side (the arrow Y1 direction side). The lens members 11 are made of acrylic or another such plastic, or any other suitable material as used in the art. The lens members 11 are configured such that the light emitted from the light sources 2 will be emitted in a state of having a specific light distribution angle. As shown in FIG. 7, each of the lens members 11 includes a lens 11a and a plurality of (three in the illustrated embodiment) legs 11b that is provided to the lower part of the lens 11a. The lens members 11 are fixed to the board 10 by adhesively bonding the legs 11b to the surface of the board 10. The lens members 11 are fixed on the board 10 along with the light sources 2 ahead of time. The lens members 11 are circular in the plan view (as seen from the display component 1 side). The lens members 11 are larger than the light sources 2. That is, the external shape of the lens members 11 in a direction parallel to the display face 1a of the display component 1 (i.e., the Z direction or the X direction) is larger than the light sources 2. The lens members 11 cover the display component 1 side of the light sources 2, including the light sources 2, over a range of a diameter d1 (see FIG. 5). The lens member 11 is an example of an "optical element" of the present disclosure. The lens member 11 is disposed between the display component 1 and the light source 2 as shown in FIG. 3. Also, the lens members 11 are positioned in a light emission direction from the light sources 2.

The connector 12 is substantially cuboid in shape, and is fixed on the board 10. The connector 12 is connected to the power supply board via a signal wire (not shown). The light sources 2 emit light upon receiving a supply of electricity from the outside via the connector 12 and wiring (not shown) formed on the board 10. The connector 12 is disposed near the center of the board 10 in its lengthwise direction. More specifically, the connector 12 is disposed at a location between the third and fourth light sources 2 from the arrow X1 direction side (or from the left side).

The first reflective member 7 is disposed between the lens members 11 and the rear frame 5 in the Y direction as shown in FIG. 7. The first reflective member 7 is positioned rearward of the display component 1. The first reflective member 7 reflects light from the light sources 2. The first reflective member 7 is molded, for example, from plastic (preferably PET (polyethylene terephthalate)), or any suitable material as used in the art. The first reflective member 7 is made up of a sheet-form reflective member (reflective sheet) having a shape that corresponds to the rear frame 5. Specifically, the first reflective member 7 has roughly the same dimensions as the surface of the rear frame 5 on the display component 1 side. The first reflective member 7 has a shape that conforms to the rear frame 5 (a concave shape that is recessed on the arrow Y2 direction side). The first reflective member 7 is formed so as to cover substantially the entire surface of the rear frame 5 on the display component 1 side, excluding the regions in which various openings (discussed below) are formed.

More specifically, as shown in FIG. 3, the first reflective member 7 includes a bottom face part 7a and a plurality of (four in FIG. 3) sloped face parts 7b. The bottom face part 7a has a rectangular shape that extends in the X direction. The sloped face parts 7b are disposed surrounding the four sides of the bottom face part 7a. The bottom face part 7a is formed so as to spread out substantially parallel to the display component 1. The sloped face parts 7b are formed so as to extend obliquely from the ends of the bottom face part 7a toward the edges of the rear frame 5.

Figure 4:
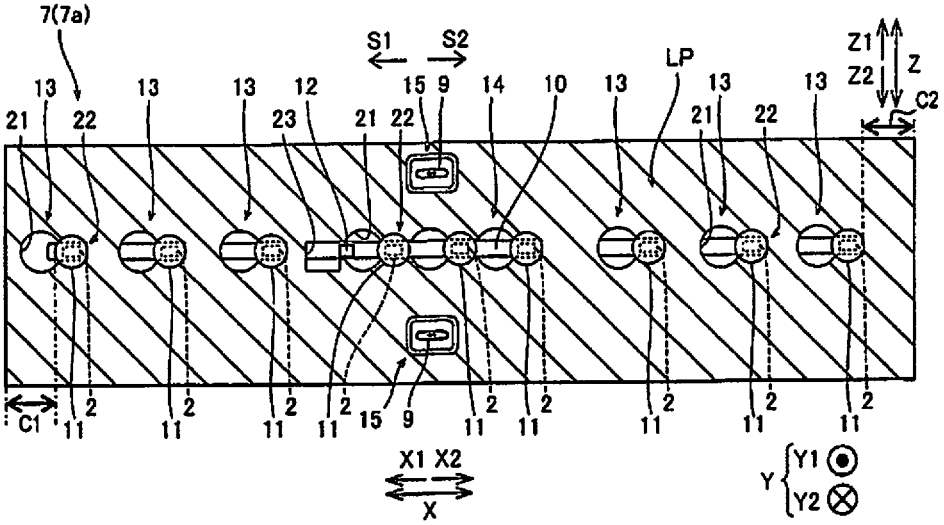
FIG. 4 is an enlarged plan view of the bottom face of a first reflective member in accordance with the first embodiment.

As shown in FIG. 4, the first reflective member 7 also includes a plurality of light source openings 13 and 14 and two panel post openings 15 in the bottom face part 7a. In FIG. 4, hatching is applied to the bottom face part 7a to make it easier to see. FIG. 4 illustrates the entire region of the bottom face part 7a of the first reflective member. The light source openings 13 and 14 are provided corresponding to the nine light sources 2 (lens members 11). More specifically, the bottom face part 7a includes six light source openings 13 corresponding to three light sources 2 (lens members 11) on both sides (on the left side and on the right side) in the X direction, and one large light source opening 14 corresponding to the connector 12 and three light sources 2 (lens members 11) in the middle. The light source openings 13 and 14 are an example of the "opening" or the "first aperture" in the present disclosure. Thus, the first reflective member 7 includes a plurality of the light source openings 13 and 14. The panel post openings 15 are provided at locations corresponding to the locations where the two panel posts 9 are disposed.

As shown in FIG. 3, the optical sheet 8 includes, for example, a diffuser, a polarizing filter, etc. In FIG. 3, it is depicted as a single member, but may instead be a structure in which a plurality of sheets are laminated. The optical sheet 8 is disposed between the light sources 2 and the display component 1. The optical sheet 8 has specific optical characteristics for diffusing the light from the light sources 2 or for making the polarization direction of the light more uniform as the light is emitted toward the display component 1.

Configuration of First Reflective Member

Figure 5:
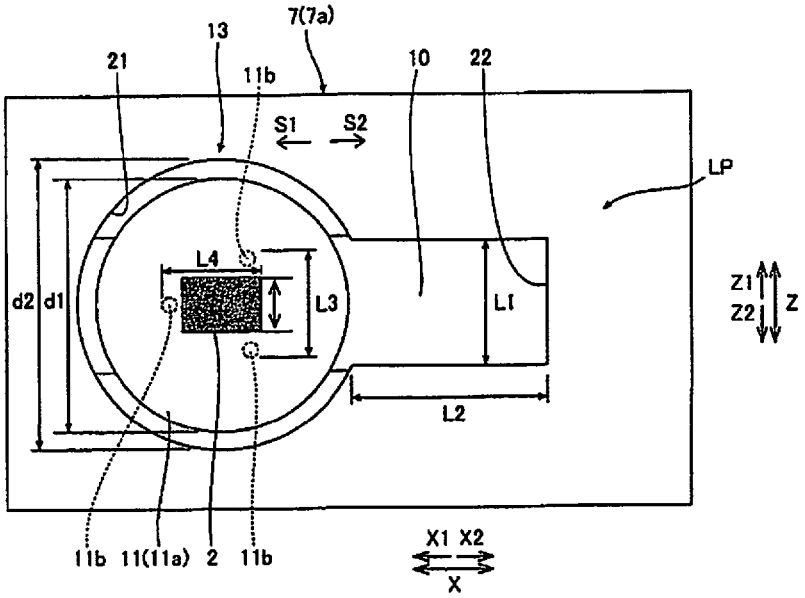
FIG. 5 is an enlarged plan view of a light source opening in the first reflective member in accordance with the first embodiment.

As shown in FIGS. 4 and 5, in the first embodiment, the light source openings 13 of the first reflective member 7 each have a first portion 21 (first opening) and a second portion 22 (second opening), as shown in FIG. 5. Thus, the first reflective member 7 includes a plurality of the first and second portions 21 and 22. The first portion 21 is dimensioned such that the lens members 11 are insertable through the first portion 21. The second portion 22 is smaller than the external shape of the lens member 11 in the direction parallel to the display face 1a of the display component 1. The second portion 22 is continuous with the first portion 21. The second portion 22 is dimensioned such that the light source 2 is disposed inside the second portion 22. As shown in FIG. 4, the larger light source opening 14 is, roughly speaking, a single opening in which three of the light source openings 13 are connected. Therefore, the light source opening 14 has the same basic structure as the light source openings 13. In other words, the light source opening 14 has a plurality of (three in FIG. 4) first portions 21 and a plurality of (three in FIG. 4) second portions 22. As shown in FIG. 4, the light source openings 13 and 14 are arranged such that the distance C1 from the left end (one end) of the leftmost lens member 11 to the left side (one side) of bottom face part 7a of the first reflective member 7 is substantially equal to the distance C2 from the right end (the other end) of the rightmost lens member 11 to the right side (the other side) of the bottom face part 7a of the first reflective member 7 when the first reflective member 7 is attached to the light source components LP. With this arrangement, the light emitted from the leftmost and rightmost lens members 11 symmetrically shines on the display component 1, and thus the uneven brightness on the display component 1 is properly prevented.

As shown in FIG. 5, the light source openings 13 are formed in the shape of a keyhole, in which the circular openings forming the first portions 21 partially overlap the rectangular openings forming the second portions 22. The first portions 21 have a shape corresponding to the external shape of the lens members 11 in the direction parallel to the display face 1a. The first portions 21 are formed in a circular shape, and are larger than the lens members 11 that are circular in the plan view. The diameter d2 of the first portions 21 is greater than the diameter (outside diameter) d1 of the lens members 11.

The second portions 22 extend continuously and linearly in the S2 direction from the first portions 21, and are rectangular in shape. That is, the first portions 21 and the second portions 22 are linearly continuous. The S2 direction is a direction that runs along the lengthwise direction of the board 10. In the illustrated embodiment, the S2 direction is parallel to the arrow X2 direction. The second portions 22 are formed in a size that allows the light sources 2 and the legs 11b of the lens members 11 disposed around the light sources 2 to fit inside. In the illustrated embodiment, the direction in which the first and second portions 21 and 22 are continuous substantially extend in the same direction (the S2 direction). As shown in FIG. 5, the first portion 21 has an opening area that is larger than an opening area of the second portion 22. As shown in FIG. 5, the length L2 of the second portion 22 in the X direction in which the first and second portions 21 and 22 are continuous is smaller than the diameter d1 (width d1) of the lens member 11.

Figure 6:
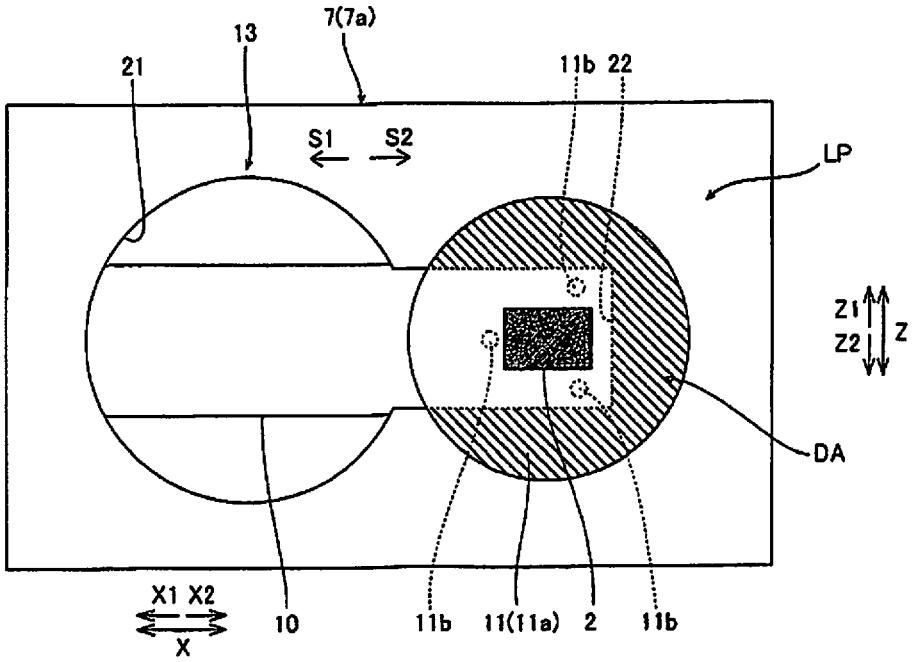
FIG. 6 is an enlarged plan view of the light source opening in the state when the light source is disposed on the inside of the second portion of the light source opening.

The length L1 of the short side of the second portions 22 and the length L2 of the long side are both less than the diameter d1 of the lens members 11. Therefore, the lens members 11 cannot pass through the second portions 22. Also, as shown in FIGS. 5 and 6, the length L1 of the short side is greater than the length L3 in the same direction of the region in which the light sources 2 and the legs 11b are disposed. The length L2 of the long side is greater than the length L4 in the same direction of the region in which the light sources 2 and the legs 11b are disposed. Therefore, as shown in FIG. 6, in a plan view seen from the display component 1 side, the outer edge of the second portion 22 is disposed at a location that overlaps the lens 11a, and is disposed so that the outer edge surrounds the light sources 2 and the legs 11b. Thus, as shown in FIG. 5, the first portion 21 has the diameter d2 (width d2) that is larger than the length L1 (width L1) of the second portion 22 in the Z direction (first direction) that is parallel to the bottom face part 7a (reflection surface) of the first reflective member 7 and is perpendicular to the X direction (direction) in which the first portion 21 and the second portion 22 are arranged. Also, the diameter d2 (width d2) of the first portion 21 is larger than the diameter d1 (width d1) of the lens member 11 (optical element) in the Z direction. Also, the length L1 (width L1) of the second portion 22 is larger than a width L5 of the light source 2 in the Z direction. Also, as mentioned above, the lens member 11 has the plurality of legs 11b. The length L1 (width L1) of the second portion 22 is larger than the length L3 (distance L3) between the legs 11b in the Z direction. Also, the width d1 of the lens member 11 is smaller than the width d2 of the first portion 21 and is larger than the width L1 of the second portion 22 in the Z direction (first direction).

As shown in FIG. 3, in each of the light source openings 13 (14), the first portion 21 is disposed at a location corresponding to the lens member 11, and the second portion 22 is disposed on a specific direction side parallel to the back face with respect to the first portion 21. That is, all of the second portions 22 of the first reflective member 7 are disposed on the same side with respect to the corresponding first portions 21 (on one side (the S2 direction side) in the lengthwise direction of the board 10). Thus, in the illustrated embodiment, the second portion 22 is disposed in a region where the lens member 11 (optical element) is disposed while the first reflective member 7 is disposed relative to the rear frame 5 (support member).

The light source opening 14 forms a single, large opening by connecting adjacent first portions 21 with the second portions 22. A third portion 23 (third opening) is provided at the end of the light source opening 14 on the arrow X1 direction side. The third portion 23 is an open region used for the connector 12 and formed so that the opening width in the Z direction is larger. Wiring (not shown) that passes between the first reflective member 7 and the rear frame 5 is pull out to the display component 1 side beyond the first reflective member 7 via the third portion 23, and is connected to the connector 12.

With this configuration, the first reflective member 7 is disposed between the lens members 11 and the rear frame 5 by first inserting the lens members 11 through the first portions 21 into the light source openings 13 (14) (see FIG. 5), and then sliding the light sources 2 in the S1 direction along the back face of the display component 1 so as to be disposed on the inside of the second portions 22. The light sources 2 are disposed at locations on the inside of the second portions 22 (see FIG. 6).

In FIG. 6, hatching is added to the overlap region DA where the first reflective member 7 and the lens members 11 overlap in a state in which the light sources 2 are disposed on the inside of the second portions 22. As a result, as shown in FIG. 7, the overlap region DA of the first reflective member 7 is disposed between the lens members 11 and the rear frame 5.

Method for Attaching First Reflective Member

As shown in FIG. 3, in the first embodiment, the first reflective member 7 is attached to the rear frame 5 after the light source component LP has been installed on the rear frame 5. The light source component LP is prepared as a module in which the light sources 2, the lens members 11, and the connector 12 are mounted on the board 10, and is installed on the rear frame 5.

In attaching the first reflective member 7, first the first reflective member 7 is positioned so that the first portions 21 of the light source openings 13 and 14 will be located above the lens members 11. Next, the lens members 11 are inserted into the first portions 21 while the first reflective member 7 is placed on the rear frame 5. As a result, as shown in FIG. 5, the light sources 2 and the lens members 11 are disposed at locations on the inside of the first portions 21. The connector 12 is inserted into the third portion 23 (see FIG. 3).

Next, the first reflective member 7 is slid to the opposite side (S1 direction) from the second portions 22 with respect to the first portions 21. The light sources 2 (lens members 11) in the first portions 21 move relatively to the second portion 22 side (S2 direction) within the light source openings 13 (14). Movement of the entire first reflective member 7 in the S1 direction causes all nine of the light sources 2 to be disposed on the inside of the second portions 22. At this point, as shown in FIG. 7, since the overlap region DA (see FIG. 6) of the first reflective member 7 is disposed between the rear frame 5 and the lens members 11, the lens members 11 function to keep the first reflective member 7 from coming loose.

The panel posts 9 are then passed through the panel post openings 15 and installed on the rear frame 5.

Thus, in the illustrated embodiment, the method (display device assembly method) comprises providing the light source 2 with the lens member 11 (optical element), and attaching the light source 2 with the lens member 11 to the first reflective member 7. The first reflective member 7 includes the light source opening 13 (14) (first aperture) with the first portion 21 and the second portion 22 that is continuous with the first portion 21. The attaching of the light source 2 with the lens member 11 to the first reflective member 7 includes inserting the lens member 11 through the first portion 21 and relatively sliding the light source 2 relative to the first reflective member 7 from the first portion 21 to the second portion 22.

Effect of First Embodiment

The following effect can be obtained with the first embodiment.

In the first embodiment, as discussed above, the light source openings 13 (14) have the first portions 21 and the second portions 22. The lens members 11 can be inserted through the first portions 21. The second portions 22 are smaller than the external shape of the lens members 11 in a direction parallel to the display face 1a of the display component 1. The second portions 22 are continuous with the first portions 21. The second portions 22 allow the light sources 2 to be disposed on the inside. The light source openings 13 (14) are provided to the first reflective member 7, which is disposed between the lens members 11 and the rear frame 5. Consequently, even in a state in which the lens members 11 have already been installed, the light sources 2 can be disposed at locations on the inside of the second portions 22 from the first portions 21 in the light source openings 13 (14) by inserting the lens members 11 and the light sources 2 through the first portions 21 into the light source openings 13 (14), and then sliding the first reflective member 7 (or the rear frame 5). As a result, the first reflective member 7 can be installed from behind the light sources 2 to which the lens members 11 are attached. Thus, assembly work is easier. Also, the second portions 22 are smaller than the lens members 11. Thus, the overlap regions DA (see FIG. 6) around the light source openings 13 (14) of the first reflective member 7 are disposed directly below the lens members 11. As a result, the light emitted directly below the lens members 11 can be reflected by the first reflective member 7 (see FIG. 7). Thus, a decrease in the light utilization efficiency can be suppressed. Therefore, assembly work can be made easier while suppressing a decrease in light utilization efficiency.

Figure 8:
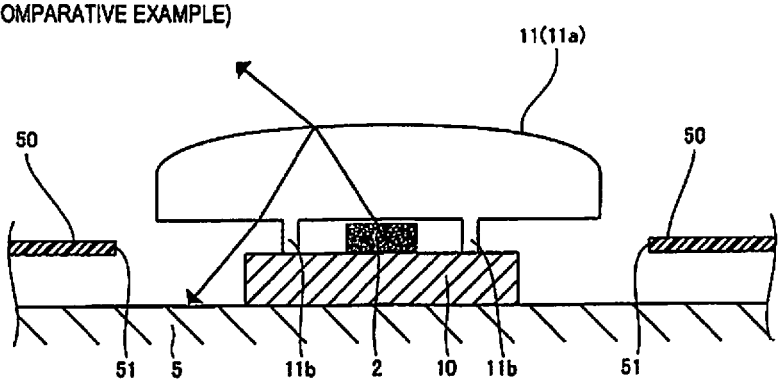
FIG. 8 is a partial cross-sectional view of the path of light from a light source in a comparative example.

More specifically, if openings 51 that are larger than the lens members 11 are formed in order to allow the lens members 11 to pass through as in the comparative example as shown in FIG. 8, it will be possible to installed a reflective member 50 from behind the light sources 2 to which the lens members 11 are attached. However, in this case, the reflective member 50 will not be disposed directly below the lens members 11. Accordingly, some of the light emitted from the light sources 2 will end up leaking from the openings 51 to the rear frame 5 side. This diminishes the light utilization efficiency. On the other hand, with the first embodiment, part of the first reflective member 7 (the overlap regions DA) can be disposed directly below the lens members 11 as shown in FIG. 7. Thus, the light emitted directly below the lens members 11 will also be reflected to the display component 1 side. This allows the light utilization efficiency to be improved.

Also, in the first embodiment, as discussed above, in each of the light source openings 13 (14), the first portion 21 is disposed at a location corresponding to the lens member 11, and the second portion 22 is disposed on a specific direction (S2 direction) side parallel to the back face with respect to the first portion 21. Consequently, the light sources 2 can be relatively moved all at once from the first portions 21 to the second portions 22 of the light source openings 13 (14) merely by sliding the first reflective member 7 to the opposite side (S1 direction side) from the specific direction. As a result, assembly work can be made easier.

Also, in the first embodiment, as discussed above, the first portions 21 and the second portions 22 are linearly continuous. That is, the first portions 21 and the second portions 22 are not connected by curved paths (grooves), but are continuous along a linear path in the S2 direction. Consequently, the light sources 2 can be easily disposed from the first portions 21 to the second portions 22 merely by sliding the first reflective member 7 linearly. Accordingly, assembly work can be further facilitated.

Also, in the first embodiment, as discussed above, the first reflective member 7 is disposed between the lens members 11 and the rear frame 5 by inserting the lens members 11 through the first portions 21 into the light source openings 13 (14), and then sliding the first reflective member 7 in the S1 direction so that the light sources 2 will be disposed inside the second portions 22. Consequently, the light sources 2 can be easily disposed in the second portions 22 by sliding the first reflective member 7. This makes the assembly work easier.

Also, in the first embodiment, as discussed above, the first reflective member 7 is formed by a reflective member having a shape that corresponds to the rear frame 5. Consequently, the first reflective member 7 can cover not only the area directly below the lens members 11, but also a wide range on the display component side of the rear frame 5. Thus, light utilization efficiency can be improved. Also, the first reflective member 7 can be easily obtained merely by forming the light source openings 13 (14) having the first portions 21 and the second portions 22 in a conventional reflective sheet (reflective member). Also, fewer parts are required than when the first reflective member 7 is provided separately from the reflective sheet, and the structure can be simplified.

Second Embodiment

The configuration of a liquid crystal television set 200 pertaining to a second embodiment will now be described through reference to FIG. 1 and FIGS. 9 to 12. In the first embodiment, the first reflective member 7 is formed by a reflective member (reflective sheet) having a shape that corresponded to the rear frame 5. On the other hand, in this second embodiment, a first reflective member 107 formed by a flat reflective member (reflective board) and a second reflective member 117 formed by a reflective member (reflective sheet) having a shape that corresponds to the rear frame 5 are provided. The liquid crystal television set 200 is an example of the "display device" in the present disclosure.

Configuration of Display Device in Second Embodiment

Figure 9:
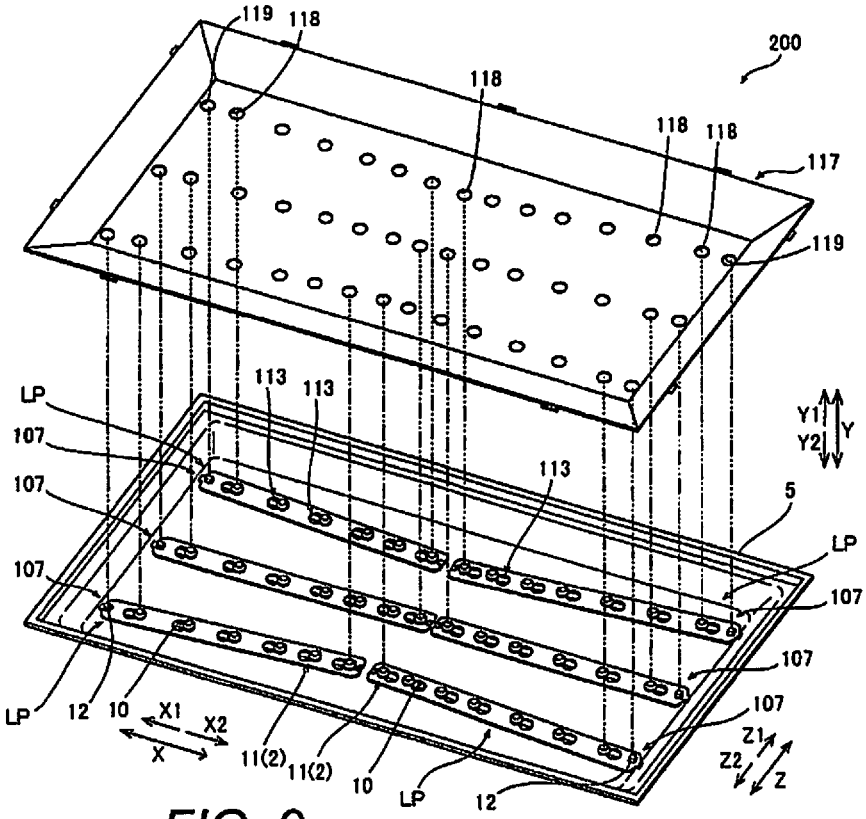
FIG. 9 is an exploded perspective view of first and second reflective members in accordance with a second embodiment.

As shown in FIG. 9, the liquid crystal television set 200 pertaining to the second embodiment (see FIG. 1) comprises the first reflective member 107 and the second reflective member 117. In this second embodiment, the panel posts 9 and the panel post openings are not depicted in the drawings.

In this second embodiment, an example is given of a large liquid crystal television set 200 equipped with 39 light sources 2. A total of six light source components LP (light source groups) are provided. In each of the light source components LP, a plurality of (six or seven in FIG. 9) the light sources 2 are linearly arranged along an arrangement direction (the S1 or S2 direction). The arrangement directions of the light sources 2 are different from each other. In particular, in the illustrated embodiment, three light source components LP on the right side are arranged non-parallel to each other, while three light source components LP on the left side are arranged non-parallel to each other. However, some of the light source components LP can be arranged parallel to each other. For example, the top-left light source component LP and the bottom-right light source component LP can be arranged parallel to each other, the middle-left light source component LP and the middle-right light source component LP can be arranged parallel to each other, and/or the bottom-left light source component LP and the top-right light source component LP can be arranged parallel to each other. The light sources 2 are arranged in straight rows at a specific spacing on linear boards 10. Six or seven of the light sources 2 are installed on each of the boards 10.

The boards 10 are installed such that they are not parallel to each other, on the inner face of the rear frame 5. That is, the boards 10 are installed on the rear frame 5 at mutually different angles of inclination within a plane that is parallel to the back face of the display component 1. Consequently, the light sources 2 on the boards 10 are disposed in a plurality of rows that are not parallel to each other. The locations of the light source components LP are the result of optimizing the locations of the light sources 2 so that the light from the light sources 2 will illuminate the display component 1 side as uniformly as possible. Also, connectors 12 are provided to the boards 10 near the ends in the lengthwise direction. Thus, in the illustrated embodiment, the liquid crystal television set 200 further comprises the boards 10 (wiring boards) on which the light sources 2 are installed and that have the connectors 12 near the ends, respectively.

With the second embodiment, the first reflective member 107 is formed by a flat reflective member (reflective board) (see FIG. 10) that covers part of the rear frame 5. The first reflective members 107 are provided to the rows of the light sources 2 to extend along the rows of the light sources 2, respectively. In other words, the first reflective members 107 are provided in a plural number (six in FIG. 9) corresponding to the light source components LP. The first reflective member 107 has a slender, linear shape that runs along the lengthwise direction of the board 10, and is formed so as to be larger than the board 10. The second reflective member 117 is formed by a sheet-form reflective member (reflective sheet) having a shape that corresponds to the rear frame 5. In a plan view seen from the display component 1 side, the first reflective member 107 is smaller than the second reflective member 117. As discussed below, the first reflective members 107 are provided so as to correspond to one or more through-holes 118 formed in the second reflective member 117. The first reflective members 107 and the second reflective members 117 are molded from PET or another such plastic material just as in the first embodiment above, and the same material may be used.

The first reflective members 107 extend along the rows of the light sources 2, and one is provided for every row of light sources 2. That is, in the second embodiment, a total of six first reflective members 107 are provided for the six light source components LP.

Figure 10:
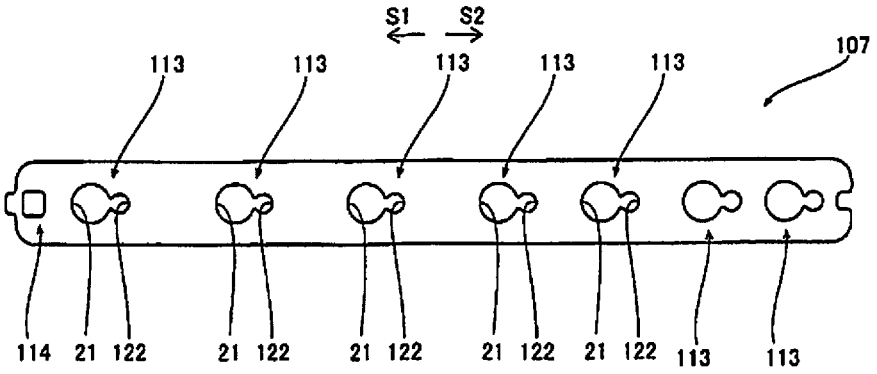
FIG. 10 is a plan view of the first reflective member in accordance with the second embodiment.

As shown in FIG. 10, the first reflective member 107 includes a plurality of (seven in FIG. 10) openings 113 each having a first portion 21 (first opening) and a second portion 122 (second opening). The openings 113 are provided individually with respect to the light sources 2 on the boards 10. The openings 113 have the same basic configuration as the light source openings 13 in the first embodiment above. In the second embodiment, an example is given in which the second portions 122 are circular. That is, the openings 113 are formed in a shape in which the circular first portions 21 and the circular second portions 122 partially overlap. The first portions 21 and the second portions 122 are linearly continuous so as to run in the lengthwise direction (the S2 direction) of the board 10. In other words, the center of the first portion 21 and the center of the second portion 122 are aligned as viewed in the S2 direction. As shown in FIG. 10, the first portion 21 has an opening area that is larger than an opening area of the second portion 122.

Figure 11:
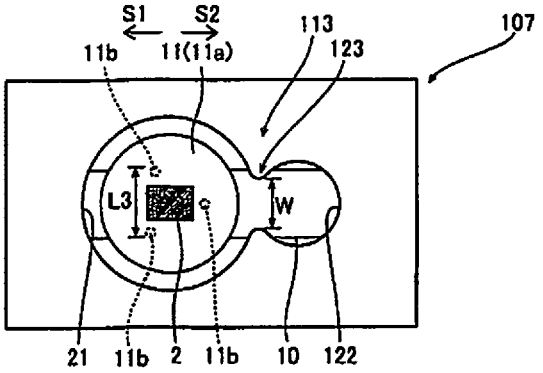
FIG. 11 is an enlarged plan view of an opening in the first reflective member in accordance with the second embodiment.
Figure 12:
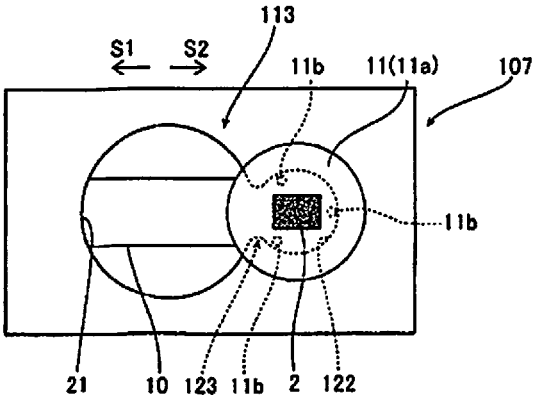
FIG. 12 is an enlarged plan view of the opening in the state when the light source is disposed on the inside of the second portion of the opening in accordance with the second embodiment.

Again in the second embodiment, as shown in FIG. 11, the first reflective member 107 is slid in the S1 direction after the lens members 11 have been inserted into the openings 113 via the first portions 21, thereby disposing the first reflective member 107 between the lens members 11 and the rear frame 5 as shown in FIG. 12. The second portions 122 are smaller than the external shape of the lens members 11 (lenses 11a) in a direction parallel to the display face 1a of the display component 1, and are larger than the region in which the light sources 2 and the legs 11b are disposed. In other words, in a plan view seen from the display component 1 side, the outer edges of the second portions 122 are disposed at locations overlapping the lenses 11a, and the outer edges are disposed so as to surround the light sources 2 and the legs 11b. As shown in FIGS. 11 and 12, the length of the second portion 122 in the S1 or S2 direction in which the first and second portions 21 and 122 are continuous is smaller than the diameter (width) of the lens member 11.

As shown in FIG. 11, the openings 113 are formed such that the width W of the linked part 123 that links the first portion 21 and the second portion 122 (the width in a direction perpendicular to the slide direction S1) is less than the length L3 of the region in which the light sources 2 and the legs 11b are disposed in the same direction. During assembly, if the first reflective member 107 is moved in the S1 direction, the linked parts 123 are elastically deformed to match the length L3, which allows the legs 11b to pass through. After the light sources 2 and the legs 11b have passed to the second portion 122 side (see FIG. 12), the linked parts 123 also function as retainers to make it less likely that the light sources 2 and the legs 11b will go back to the first portion 21 side. The linked part 123 is an example of the "third opening or portion" of the present disclosure. Thus, as shown in FIG. 11, the first portion 21 and the second portion 122 are continuous via the liked part 123. Also, the linked part 123 has the width W that is smaller than the length L3 (distance L3) between the legs 11b in a direction (first direction) that is parallel to a reflection surface of the first reflective member 107 and is perpendicular to the S1 or S2 direction in which the first portion 21 and the second portion 122 are arranged.

Returning to FIG. 10, the first reflective member 107 includes an engagement hole 114 through which the connector 12 can be inserted. The engagement hole 114 has a shape that corresponds to the external shape of the connector 12. The engagement hole 114 has a rectangular shape that is slightly larger than the rectangular connector 12. The engagement hole 114 hits the connector 12 and suppresses movement of the first reflective member 107. That is, when the connector 12 is inserted into the engagement hole 114, the connector 12 engages with the engagement hole 114 and restricts movement of the first reflective member 107 along the surface of the board 10. Thus, in the illustrated embodiment, the first reflective member 107 includes the engagement hole 114 through which the connector 12 is insertable. The engagement hole 114 is disposed at a location where the connector 12 is insertable into the engagement hole 114 while the light source 2 is disposed in the second portion 122 of the opening 113 (first aperture).

Figure 13:
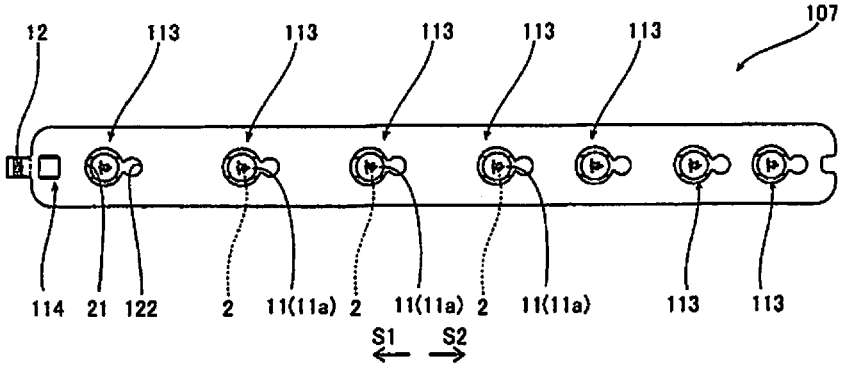
FIG. 13 is a plan view of the first reflective member illustrating the positional relation between a connector and an engagement hole of the first reflective member.
Figure 14:
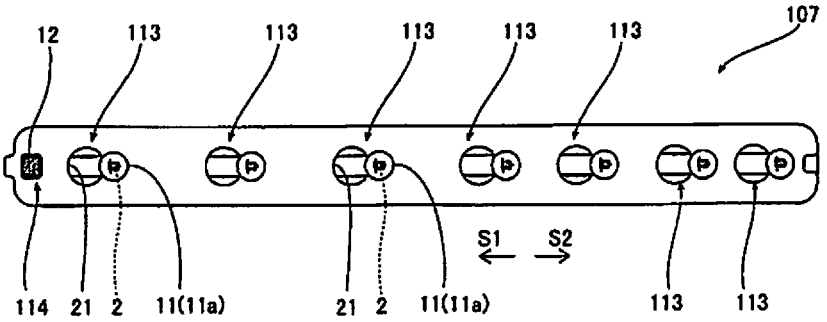
FIG. 14 is a plan view of the first reflective member illustrating the engagement state of the connector and the engagement hole of the first reflective member.

The engagement hole 114 is disposed at a location where it is possible for the connector 12 to be inserted into the engagement hole 114 in a state in which the light sources 2 have been disposed in the second portions 122 inside the openings 113. That is, as shown in FIG. 13, in a state in which the lens members 11 have been inserted through the first portions 21 into the openings 113, there is offset in the positions of the engagement hole 114 and the connector 12 (indicated by hatching). As shown in FIG. 14, when the first reflective member 107 is slid until the light sources 2 are disposed on the inside of the second portions 122, the positions of the engagement hole 114 and the connector 12 match up. The first reflective member 107 can be installed by sliding it while elastically deforming the first reflective member 107 so that it does not interfere with the connector 12, and then finally releasing the deformation and inserting the connector 12 into the engagement hole 114.

As shown in FIG. 9, the second reflective member 117 is provided so as to overlap the first reflective member 107, and has the through-holes 118 through which the lens members 11 can be inserted. The second reflective member 117 is disposed overlapping the display component 1 side (the Y1 direction side) of the first reflective member 107. In the illustrated embodiment, the second reflective member 117 overlaps with the first reflective member 107, and includes the through-holes 118 (fourth openings) through which the lens members 11 (optical element) are insertable. Also, in the illustrated embodiment, the through-hole 118 (fourth opening) is disposed in a region where the lens member 11 (optical element) is disposed while the second reflective member 117 is disposed relative to the rear frame 5 (support member).

The through-holes 118 have a shape that corresponds with the external shape of the lens members 11. The throughholes 118 are formed in a circular shape that is larger than the lens members 11, which are circular in the plan view. No second portion is provided to the through-holes 118. The through-holes 118 are provided in the same number as the light sources 2. Through-holes 119 are also provided to the second reflective member 117 for inserting the connectors 12.

Figure 15:
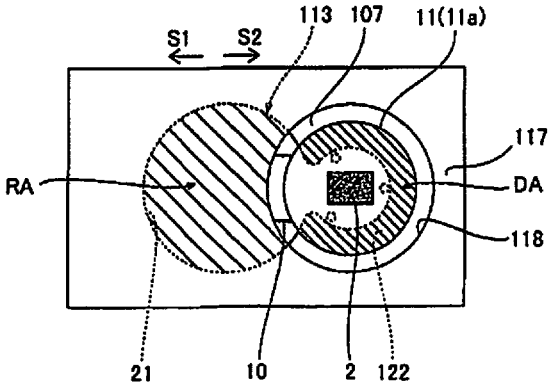
FIG. 15 is an enlarged plan view of the opening in the state when the first reflective member and the second reflective member overlap.

With the above configuration, in the second embodiment, first the first reflective member 107 is installed so that the light sources 2 are disposed (see FIG. 12) on the inside of the second portions 122 at the light source components LP. Then, the second reflective member 117 is installed so that the lens members 11 of all of the light sources 2 are inserted into the through-holes 118. As a result, as shown in FIG. 15, the second reflective member 117 covers the first portions 21, which are open at locations on the S1 direction side of the lens members 11 disposed at the locations of the second portions 122.

Overlap regions DA between the first reflective members 107 and the lens members 11 (around the second portions 122) are disposed at locations directly under the lens members 11. Also, the second reflective member 117 is disposed at a location where the first portions 21 are formed. The reflective region RA in FIG. 15 is the overlap region between the second reflective member 117 and the first portions 21 of the first reflective member 107. The reflective region RA is a region in which light cannot be reflected by the first portions 21 (the openings 113) of the first reflective member 107, but light can be reflected by the second reflective member 117. As shown in FIG. 15, in the illustrated embodiment, the openings 113 (first apertures or first and second portions 21 and 22) have an opening area that is larger than an opening area of the through-holes 118 (fourth openings).

The rest of the configuration of the second embodiment is the same as that in the first embodiment above.

Effect of Second Embodiment

The following effect can be obtained with the second embodiment.

In the second embodiment, just as in the first embodiment above, providing the first reflective member 107 with the openings 113 having the first portions 21 and the second portions 122 makes it possible for the first reflective member 107 to be installed from behind the light sources 2 to which the lens members 11 are attached, and the first reflective member 107 can be disposed directly under the lens members 11. Thus, assembly work can be made easier while making it less likely that there will be a decrease in light utilization efficiency.

Also, in the second embodiment, as discussed above, the second reflective member 117 is provided overlapping the first reflective members 107, and has the through-holes 118 through which the lens members 11 can be inserted. In the illustrated embodiment, the second reflective member 117 (e.g., either the first reflective member 107 or the second reflective member 117) is formed by a reflective member having a shape that corresponds to the rear frame 5, and the first reflective member 107 (the other of the first reflective member 107 and the second reflective member 117) is formed by a reflective member that covers part of the rear frame 5. Consequently, the second reflective member 117 can be disposed overlapping the first reflective member 107 at the first portions 21, which cannot reflect light. As a result, light shined at the first portions 21 can be reflected by the second reflective member 117. Thus, a decrease in light utilization efficiency can be suppressed even further. Also, compared to when the first reflective member 107 and the second reflective member 117 are both formed by a large reflective member, there is less wasted overlapping region that does not contribute to improving the light utilization efficiency. Thus, the reflective member can be reduced to a smaller amount.

Also, in the second embodiment, as discussed above, the first reflective member 107 is formed by a flat reflective member (reflective board), and the second reflective member 117 is formed by a sheet-form reflective member (reflective sheet). Consequently, the entire display component-side surface of the rear frame 5 can be easily covered by the sheet-form second reflective member 117, and the first reflective member 107, which is slid during installation, can be formed by a reflective board that is smaller than the reflective sheet. This facilitates assembly work on the first reflective member 107.

Also, with the second embodiment, as discussed above, the light sources 2 are disposed in a plurality of rows that are not parallel to each other. The first reflective member 107 extends along each row of the light sources 2, and is provided to each row of light sources 2. Consequently, even though the configuration involves a plurality of non-parallel rows of the light sources 2, the first reflective members 107 may be provided, which are slid in the direction in which the individual light sources 2 extend. Thus, the basic configuration of the first reflective members 107 can be shared. This allows the assembly work for the various first reflective members 107 to be performed with ease.

Also, in the second embodiment, as discussed above, the connectors 12 are disposed near the ends of the board 10. The engagement holes 114 are provided to the first reflective members 107. The engagement holes 114 allow the connectors 12 to be inserted and to suppress movement of the first reflective members 107 upon hitting the connectors 12. In a state in which the light sources 2 are disposed in the second portions 122, the engagement hole 114 is disposed at a location at which the connector 12 can be inserted into the engagement hole 114. Consequently, when the first reflective member 107 is slid and the light sources 2 are disposed in the second portions 122 inside the openings 113, the movement of the first reflective member 107 can be restricted so that the light sources 2 will not move from the second portions 122 to the first portion 21 side, merely by disposing the connector 12 in the engagement hole 114. As a result, even if the liquid crystal television set 200 should be subjected to external force or vibration during transport, etc., movement of the first reflective members 107 can be suppressed.

Also, the other effects of the liquid crystal television set 200 pertaining to the second embodiment are the same as those obtained with the liquid crystal television set 100 in the first embodiment.

Third Embodiment

Figure 16:
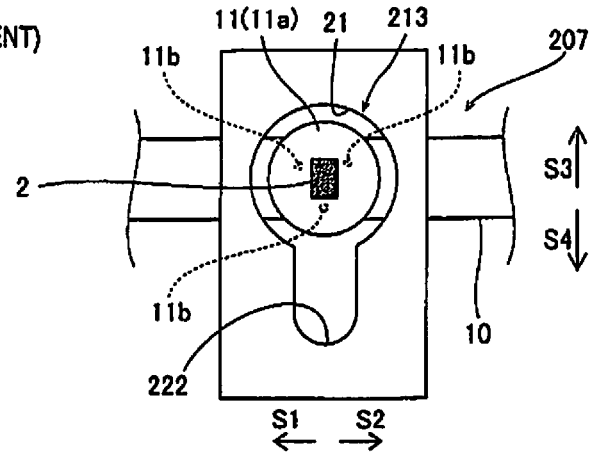
FIG. 16 is an enlarged plan view of an opening in a first reflective member in accordance with a third embodiment.
Figure 17:
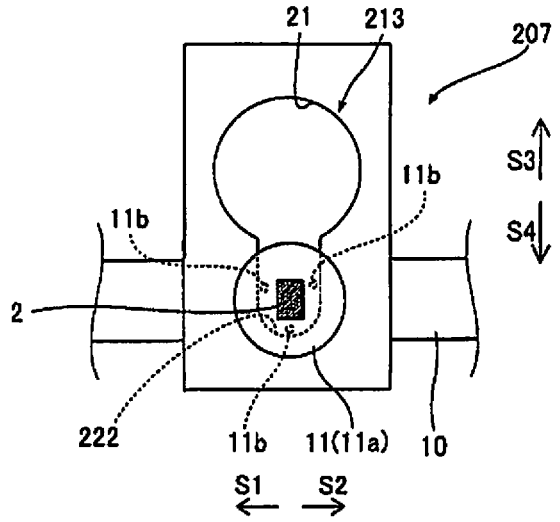
FIG. 17 is an enlarged plan view of the opening in the state when the light source is disposed on the inside of the second portion of the opening in accordance with the third embodiment.

A third embodiment will now be described through reference to FIGS. 1, 16, and 17. In this third embodiment, we will describe an example of the shape of an opening 213 in a first reflective member 207. In this third embodiment, the configuration other than that of the opening 213 in the first reflective member 207 is the same as that in the first embodiment above, and will therefore not be described again.

Configuration of Third Embodiment

In the first and second embodiments above, the locations where the second portions 22 (122) are disposed with respect to the first portions 21 run along the lengthwise direction (S2 direction) of the board 10. On the other hand, with the liquid crystal television set 300 in the third embodiment (see FIG. 1), as shown in FIG. 16, a second portion 222 (second opening) extends from the first portion 21 (first opening) in a direction that is different from the lengthwise direction of the board 10. The liquid crystal television set 300 is an example of the "display device" in the present disclosure.

In the third embodiment, the opening 213 has a shape in which the circular first portion 21 partially overlaps the oval second portion 222. The second portion 222 of the opening 213 is formed so as to extend in the S4 direction (the short-side direction of the board 10), which is perpendicular to the lengthwise direction of the board 10. As shown in FIGS. 16 and 17, the first portion 21 has an opening area that is larger than an opening area of the second portion 222. As shown in FIGS. 16 and 17, the length of the second portion 222 in the S3 or S4 direction in which the first and second portions 21 and 222 are continuous is smaller than the diameter (width) of the lens member 11.

The first reflective member 207 is slid in the opposite direction from the S4 direction (the S3 direction) after the lens members 11 have been inserted into the openings 213 via the first portions 21. The sliding of the first reflective member 207 causes the light sources 2 to move relatively in the S4 direction from the first portions 21, so that the light sources 2 are disposed at locations on the inside of the second portions 222 as shown in FIG. 17. Consequently, the first reflective member 207 is disposed between the lens members 11 and the rear frame 5.

The rest of the configuration of the liquid crystal television set 300 pertaining to the third embodiment is the same as that of the liquid crystal television set 100 in the first embodiment.

Effect of Third Embodiment

The following effect can be obtained with the third embodiment.

In the third embodiment, just as in the first embodiment above, providing the first reflective member 207 with the openings 213 having the first portions 21 and the second portions 222 makes it possible for the first reflective member 207 to be installed from behind the light sources 2 to which the lens members 11 are attached, and allows the first reflective member 207 to be disposed directly under the lens members 11. Thus, assembly work is easier and a decrease in light utilization efficiency can be suppressed.

Also, the other effects of the liquid crystal television set 300 pertaining to the third embodiment are the same as those obtained with the liquid crystal television set 100 in the first embodiment.

Modification Examples

The embodiments disclosed herein are just examples in every respect, and should not be considered to be limiting in nature. The scope of the present invention is given by the patent claims and not by the above description of embodiments, and furthermore all modifications (modification examples) within the meaning and range of equivalency of the claims are included.

For instance, in the first to third embodiments above, a liquid crystal television set is used as an example of a display device, but the present invention is not limited to or by this. Something other than a liquid crystal television set may be used as the display device, for example. For example, a PC (personal computer) display device or another such typical display device may be used as the display device.

Also, in the first to third embodiments above, the first portions 21 are formed in a circular shape, but the present invention is not limited to or by this. The shape of the first portions 21 need not be circular. The first portions 21 preferably are formed in a shape that corresponds to the lens members 11. This reduces the gap that results when the lens members 11 are inserted into the first portions 21, and keeps the opening surface area to a minimum.

Also, in the first to third embodiments above, three shape examples, such as the rectangular second portions 22, the circular second portions 122, and the oval second portions 222, are given, but the present invention is not limited to or by this. The second portions may be formed in some shape other than the above-mentioned three shapes.

Also, in the first to third embodiments above, the first portions 21 and the second portions 22 (122, 222) are formed so as to be continuous, but the present invention is not limited to or by this. For instance, the first portions and the second portions may be separated, and then connected together by groove-shaped channels. In this case, sliding the first reflective member causes the light sources to go from the first portions and through the channels, and be disposed in the second portions.

Figure 18:
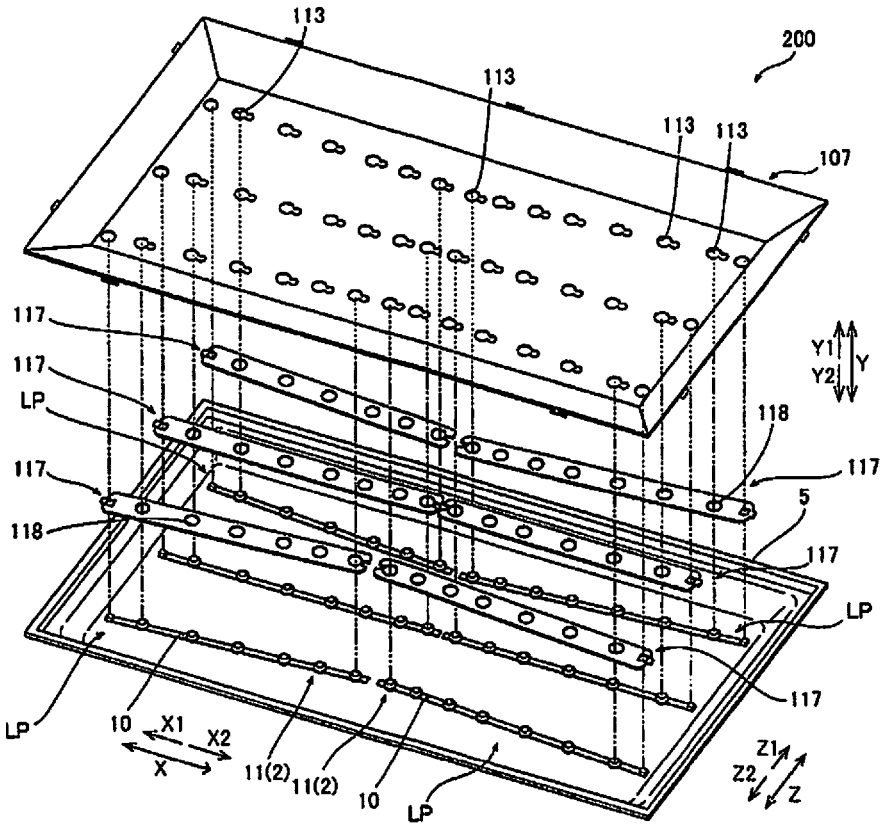
FIG. 18 is an exploded perspective view of first and second reflective members in accordance with a modification example of the second embodiment.

Also, in the second embodiment above, the first reflective member 107 is formed by a reflective member (reflective board) that covers part of the rear frame 5, while the second reflective member 117 is formed by a reflective member (reflective sheet) having a shape that corresponded to the rear frame 5. However, the present invention is not limited to or by this. In the present invention, as in the modification example shown in FIG. 18, the first reflective member 107 including the openings 113 can be formed by a reflective member (reflective sheet) having a shape that corresponds to the rear frame 5, while the second reflective member 117 including the through-holes 118 can be formed by a reflective member (reflective board) that covers part of the rear frame 5. Thus, in the second embodiment, as shown in FIG. 9, the second reflective member 117 (one of the first reflective member and the second reflective member) has a larger reflection area than the first reflective member 107 (the other one of the first reflective member and the second reflective member). Also, the second reflective member 117 (one of the first reflective member and the second reflective member) is formed by a reflective member having a shape corresponding to the rear frame 5 (support member). On the other hand, in the modification example, as shown in FIG. 18, the first reflective member 107 (one of the first reflective member and the second reflective member) has a larger reflection area than the second reflective member 117 (the other one of the first reflective member and the second reflective member). Also, the first reflective member 107 (one of the first reflective member and the second reflective member) is formed by a reflective member having a shape corresponding to the rear frame 5 (support member).

Also, in the second embodiment as shown in FIG. 9 and in the modification example as shown in FIG. 18, the assembly method (display device assembly method) comprises providing the light source 2 with the lens member 11 (optical element), and attaching the light source 2 with the lens member 11 to the first reflective member 107. The first reflective member 107 includes the opening 113 (first aperture) with the first portion 21 and the second portion 122 that is continuous with the first portion 21. The attaching of the light source 2 with the lens member 11 to the first reflective member 107 includes inserting the lens member 11 through the first portion 21 and relatively sliding the light source 2 relative to the first reflective member 107 from the first portion 21 to the second portion 122. Furthermore, in the second embodiment as shown in FIG. 9, the assembly method further comprises inserting the lens member 11 (optical element) through the through-hole 118 (fourth opening) of the second reflective member 117 to attach the second reflective member 117 to the light source 2 with the lens member 11 after the attaching of the light source 2 with the lens member 11 to the first reflective member 107. On the other hand, in the modification example as shown in FIG. 18, the assembly method further comprises inserting the lens member 11 (optical element) through the through-hole 118 (fourth opening) of the second reflective member 117 to attach the second reflective member 117 to the light source 2 with the lens member 11 before the attaching of the light source 2 with the lens member 11 to the first reflective member 107.

Also, in the first and second embodiments above, the first reflective member 7 (107) is slid in the S1 direction so as to run along the lengthwise direction of the board 10, while in the third embodiment above, the first reflective member 207 is slid in the S3 direction along the short-side direction of the board 10. However, the present invention is not limited to or by this. The direction in which the first reflective member is slid may be any direction that is parallel to the back face of the display component 1.

Figure 19A:
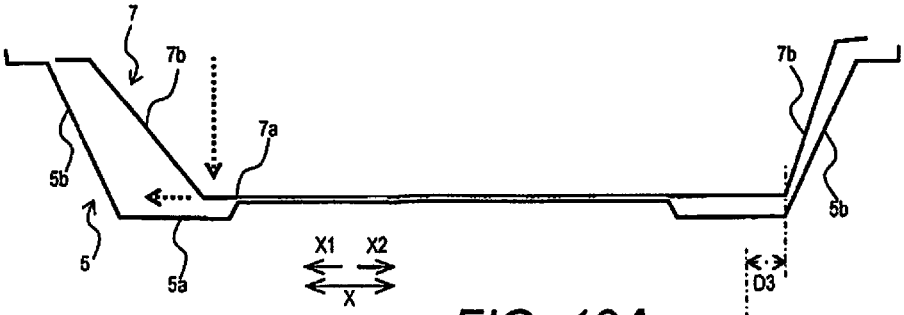
FIGS. 19A and 19B are schematic cross sectional views of a rear frame and a first reflective member.
Figure 19B:
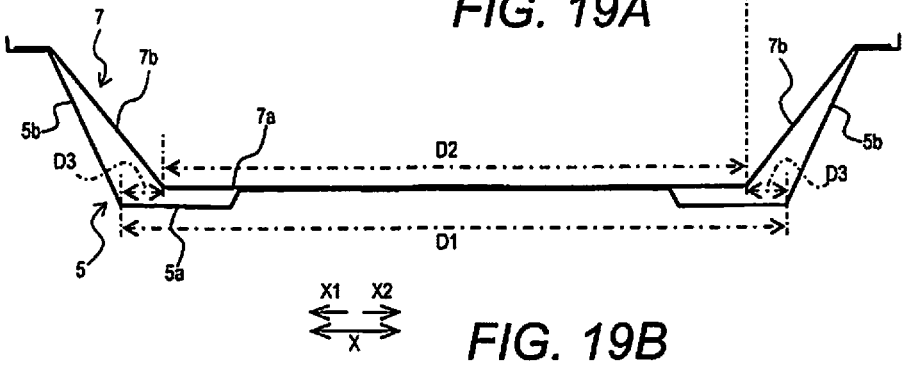

Also, in the first embodiments above, as shown in FIGS. 19A and 19B, the dimension D1 of the bottom face 5a of the rear frame 5 (support member) in the X direction is at least the sum of the dimension D2 of the bottom face part 7a (bottom face) of the first reflective member 7 in the X direction and two times of the movement amount D3 of the first reflective member 7 relative to the light source 2 in the X direction to move the light source 2 from the first portion 21 (first opening) to the second portion 22 (second opening) ($D1 \geq D2+D3\times2$). More specifically, as shown in FIGS. 5 and 6, when the first reflective member 7 is attached to the rear frame 5, the first reflective member 7 is first placed to the rear frame 5 such that the lens members 11 are inserted through the first portions 21 into the light source openings 13 14) (see FIGS. 5 and 19A). Then, the first reflective member 7 is slid in the X1 direction relative to the rear frame 5 by the movement amount D3 such that the light sources 2 moves from the first portions 21 to the second portions 22 see FIGS. 6 and 19B). In other words, the first reflective member 7 moves relative to the light sources 2 by the movement amount D3. This movement amount D3 is a movement amount of the first reflective member 7 by which the first reflective member 7 is moved relative to the light source 2 from a state shown in FIG. 5 to a state shown in FIG. 6. With this arrangement, the first reflective member 7 can be prevented from being bent by hitting the sloped face parts 5b of the rear frame 5 extending forward and outward from the bottom face 5a when the first reflective member 7 is moved in the XI direction by the movement amount D3. This also can prevents the uneven brightness of the light reflected on the first reflective member 7. Also, similar arrangement can be applied to the configurations of the second or third embodiment. For example, in the modification example of the second embodiment, the dimension of the bottom face of the rear frame 5 (support member) in the X direction is at least the sum of the dimension of the bottom face of the first reflective member 107 in the X direction and two times of the movement amount of the first reflective member 107 relative to the light source 2 in the X direction to move the light source 2 from the first portion 21 (first opening) to the second portion 122 (second opening) in the opening 113.

The display device pertaining to one aspect of the present invention comprises a display component, a light source, a lens member, a support member, and a first reflective member. The light source is disposed on the back face side of the display component. The lens member has an exterior shape that is larger than the light source in a direction parallel to the display face of the display component. The lens member is installed on the display component side of the light source. The support member supports the light source. The first reflective member is disposed between the lens member and the support member. The first reflective member includes an opening having a first portion and a second portion. The lens member can be inserted through the first portion. The second portion is smaller than the exterior shape of the lens member in a direction parallel to the display face of the display component, is continuous with the first portion, and allows the light source to be disposed on the inside. The "back face of the display component" is the face on the opposite side from the display face of the display component.

With the display device pertaining to the this aspect of the invention, as mentioned above, the first reflective member disposed between the lens member and the support member is provided with the opening having the first portion through which the lens member can be inserted, and the second portion that is smaller than the exterior shape of the lens member in the direction parallel to the display face of the display component, that is continuous with the first portion, and that allows the light source to be disposed on the inside. Consequently, after the lens member is installed to the light source, the light source can be disposed at a location inside the second portion from the first portion in the opening by inserting the lens member and the light source through the first portion into the opening, and then sliding the first reflective member (or the support member) parallel to the back face of the display component. As a result, the first reflective member can be installed from the rear of the light source to which the lens member is attached. Thus, the assembly work is easier. Also, the second portion is smaller than the lens member. Thus, the portion of the first reflective member that is around the opening will be disposed directly under the lens member. As a result, light emitted directly under the lens member can be reflected by the first reflective member. Thus, a decrease in the light utilization efficiency can be suppressed. Therefore, assembly work will be easier, while a decrease in the light utilization efficiency can be suppressed.

With the above display device pertaining to one aspect, it is preferable if a plurality of each of the light source and the lens member are provided, the first reflective member includes a plurality of the opening, and in each of the openings, the first portion is disposed at a location corresponding to the lens member, and the second portion is disposed to one side in a specific direction parallel to the back face with respect to the first portion. With this configuration, a plurality of the light sources can be moved relatively from the first portion of the opening to the second portion merely by sliding the first reflective member to the opposite side from the specific direction (moving the light sources relatively to the specific direction side). As a result, assembly work will be even easier.

With the above display device pertaining to one aspect, it is preferable if the first portion and the second portion are linearly continuous. Here, the phrase that the first portion and the second portion are linearly continuous means that the first portion and second portion are not connected by a curved path (groove), and instead are continuous in a linear path. With this configuration, the light source can be easily disposed from the first portion to the second portion merely by sliding the first reflective member in a straight line. Therefore, assembly work will be even easier.

With the above display device pertaining to one aspect, it is preferable if the first reflective member is formed by a reflective member whose shape corresponds to the support member. With this configuration, the first reflective member can cover not just directly under the lens member, but also a wide range on the display component side of the support member. Thus, the light utilization efficiency can be improved. Also, the first reflective member can be easily obtained merely by forming the opening having the first portion and the second portion in a conventional reflective sheet (reflective member). Also, fewer parts are required and the structure can be simpler than when a first reflective member is provided separately from the reflective sheet.

With the above display device pertaining to one aspect, it is preferable if the device further comprises a second reflective member that is provided so as to overlap with the first reflective member, and that has a through-hole through which the lens member can be inserted. Furthermore, either the first reflective member or the second reflective member is formed by a reflective member whose shape corresponds to the support member, while the other of the first reflective member and the second reflective member is formed by a reflective member that covers part of the support member. With this configuration, the second reflective member can be disposed overlapping the first portion of the first reflective member, which cannot reflect light. As a result, since light emitted by the first portion can be reflected by the second reflective member, a decrease in light utilization efficiency can be further suppressed. Also, compared to when the first reflective member and second reflective member are both formed by a large reflective member, them is less wasted overlapping region that does not contribute to improving the light utilization efficiency. Thus, the reflective member can be used in a smaller amount.

In this case, it is preferable if the light source is disposed in a plurality of rows that are not parallel to one another. The first reflective member is formed by a reflective member that covers part of the support member, extends along each light source row, and is provided to each light source row. With this configuration, even though there are a plurality of light source rows that are not parallel, the first reflective member can be slid in the direction in which each light source row extends. Thus, the basic structure of the first reflective members can be shared, and the assembly work of the various first reflective members can be carried out easily.

With the above display device pertaining to one aspect, it is preferable if the display device further comprises a wiring board on which the light source is installed and which has a connector near the end. The first reflective member includes an engagement hole through which the connector can be inserted. The engagement hole is disposed at a location where the connector can be inserted into the engagement hole in a state in which the light source has been disposed in the second portion in the opening. With this configuration, when the first reflective member is slid so that the light source is disposed at the second portion inside the opening, the movement of the first reflective member can be restricted so that the light source will not move from the second portion to the first portion side, merely by disposing a connector in the engagement hole. As a result, movement of the first reflective member can be suppressed even when the display device is subjected to external force or vibration during transport, etc.

With the present invention, as discussed above, assembly work can be made easier, while a decrease in light utilization efficiency can be suppressed.

[1] In view of the state of the known technology and in accordance with a first aspect of the present invention, a display device is provided that comprises a display component, a light source, an optical element, and a first reflective member. The optical element is positioned in a light emission direction from the light source. The first reflective member is positioned rearward of the display component. The first reflective member includes a first opening and a second opening that is continuous with the first opening and in which the light source is positioned. A width of the optical element is smaller than a width of the first opening and is larger than a width of the second opening in a first direction.

With the display device pertaining to this aspect, even if the optical element is installed to the light source in advance, the light source can be disposed at a location inside the second opening from the first opening by inserting the optical element and the light source through the first opening, and then sliding the first reflective member (or a support member supporting the light source) parallel to a back face of the display component, for example. As a result, the first reflective member can be installed to the light source with the optical element after the optical element is attached to the light source. Thus, the assembly work can become easier. Also, if the second opening is smaller than the optical element, then part of the first reflective member around the second opening can be disposed directly under the optical element, for example. In this case, light emitted directly under the optical element can be reflected by the first reflective member. Thus, a decrease in the light utilization efficiency can be suppressed. Therefore, in this case, assembly work will be easier, while a decrease in the light utilization efficiency can be suppressed.

[2] In accordance with a preferred embodiment according to the display device mentioned above, the width of the second opening is larger than a width of the light source in the first direction.

[3] In accordance with a preferred embodiment according to any one of the display devices mentioned above, the optical element includes a plurality of legs, and the width of the second opening is larger than a distance between the legs in the first direction.

[4] In accordance with a preferred embodiment according to any one of the display devices mentioned above, the first opening and the second opening are continuous via a third opening, and the third opening having a width that is smaller than the distance between the legs in the first direction.

[5] In accordance with a preferred embodiment according to any one of the display devices mentioned above, the first opening and the second opening are linearly continuous. The phrase that the first opening and the second opening are linearly continuous means that the first opening and second opening are not connected by a curved path (groove), and instead are continuous in a linear path, for example. With this configuration, the light source can be easily disposed from the first opening to the second opening merely by sliding the first reflective member along a straight line. Therefore, assembly work will be even easier.

[6] In accordance with a preferred embodiment according to any one of the display devices mentioned above, the first reflective member is formed by a reflective member having a shape corresponding to a support member supporting the light source. With this configuration, the first reflective member can cover not just directly under the optical element, but also a wide range on a display component side of the support member. Thus, the light utilization efficiency can be improved. Also, the first reflective member can be easily obtained merely by forming the first aperture having the first opening and the second opening in a conventional reflective sheet (reflective member). In this case, fewer parts are required and the structure can be simpler than when a first reflective member is provided separately from the reflective sheet.

[7] In accordance with a preferred embodiment according to any one of the display devices mentioned above, the light source and the optical element are each provided in a plural number, and the first reflective member includes a plurality of the first and second openings, directions in which the first and second openings are continuous substantially extend in a same direction. With this configuration, the plurality of the light source can be moved relatively from the first opening to the second opening merely by sliding the first reflective member in one direction (by merely moving the plurality of the light source relatively to a direction opposite the one direction). As a result, assembly work will be even easier.

[8] In accordance with a preferred embodiment according to any one of the display devices mentioned above, the display device further comprises a second reflective member overlapping with the first reflective member, and including a fourth opening through which the optical element is insertable. With this configuration, the second reflective member can be disposed overlapping the first opening of the first reflective member, which cannot reflect light, for example. In this case, the light emitted towards the first opening can be reflected by the second reflective member, for example. Thus, a decrease in light utilization efficiency can be further suppressed. Also, when the first reflective member and second reflective member are both constituted by a large reflective member, there is a wasted overlapping region that does not contribute to improving the light utilization efficiency. Thus, one of the first reflective member and the second reflective member can be formed by a reflective member having a shape corresponding to a support member, while the other one of the first reflective member and the second reflective member can be formed by a reflective member that covers part of the support member. In this case, the reflective member can be used in a smaller to amount, while improving the light utilization efficiency.

[9] In accordance with a preferred embodiment according to any one of the display devices mentioned above, the first and second openings have an opening area that is larger than an opening area of the fourth opening.

[10] In accordance with a preferred embodiment according to any one of the display devices mentioned above, one of the first reflective member and the second reflective member has a larger reflection area than the other one of the first reflective member and the second reflective member.

[11] In accordance with a preferred embodiment according to any one of the display devices mentioned above, one of the first reflective member and the second reflective member is formed by a reflective member having a shape corresponding to a support member supporting the light source.

[12] In accordance with a preferred embodiment according to any one of the display devices mentioned above, the light source includes a plurality of light source groups in each of which a plurality of light sources are linearly arranged along an arrangement direction, the arrangement directions being different from each other, and the first reflective member is provided in a plural number corresponding to the light source groups. With this configuration, even though there are a plurality of rows of the light source that are not parallel, the first reflective member can be provided by sliding the first reflection member in each direction in which each row of the light source extends. Thus, the basic structure of a plurality of the first reflective member can be shared, and the assembly work of each first reflective member can be carried out easily.

[13] In accordance with a preferred embodiment according to any one of the display devices mentioned above, the display device further comprises a wiring board on which the light source is installed and that has a connector near an end. The first reflective member includes an engagement hole through which the connector is insertable, and the engagement hole is disposed at a location where the connector is insertable into the engagement hole while the light source is disposed in the second opening. With this configuration, when the first reflective member is slid so that the light source is disposed at the second opening, the movement of the first reflective member can be restricted so that the light source will not move from the second opening to the first opening side, merely by disposing the connector in the engagement hole. As a result, movement of the first reflective member can be suppressed even when the display device is subjected to external force or vibration during transport, etc.

[14] In accordance with a preferred embodiment according to any one of the display devices mentioned above, the second opening is disposed in a region where the optical element is disposed while the first reflective member is disposed relative to a support member supporting the light source.

[15] In accordance with a preferred embodiment according to any one of the display devices mentioned above, the fourth opening is disposed in a region where the optical element is disposed while the second reflective member is disposed relative to a support member supporting the light source.

[16] In accordance with a preferred embodiment according to any one of the display devices mentioned above, the display device further comprises a support member supporting the light source. A dimension of a bottom face of the support member is at least a sum of a dimension of a bottom face of the first reflective member and two times of a movement amount of the first reflective member relative to the light source to move the light source from the first opening to the second opening.

[17] In accordance with a preferred embodiment according to any one of the display devices mentioned above, a distance from one end of the optical element to one side of the first reflective member is substantially equal to a distance from the other end of the optical element to the other side of the first reflective member.

[18] In accordance with a preferred embodiment according to any one of the display devices mentioned above, the first direction is parallel to a reflection surface of the first reflective member and is perpendicular to a direction in which the first opening and the second opening are arranged.

[19] In view of the state of the known technology and in accordance with a second aspect of the present invention, a display device is provided that comprises a display component, a light source, an optical element, and a first reflective member. The optical element is positioned in a light emission direction from the light source. The first reflective member is positioned rearward of the display component. The first reflective member includes a first opening and a second opening that is continuous with the first opening and in which the light source is positioned. The first opening has an opening area that is larger than an opening area of the second opening.

[20] In accordance with a preferred embodiment according to the display device mentioned above, a length of the second opening in a direction in which the first and second openings are continuous is smaller than a width of the optical element.

[21] In view of the state of the known technology and in accordance with a third aspect of the present invention, a display device assembly method is provided that comprises providing a light source with an optical element, and attaching the light source with the optical element to a first reflective member. The first reflective member includes a first aperture with a first opening and a second opening that is continuous with the first opening. The attaching of the light source with the optical element to the first reflective member includes inserting the optical element through the first opening and relatively sliding the light source relative to the first reflective member from the first opening to the second opening.

[22] In accordance with a preferred embodiment according to the display device assembly method mentioned above, the display device assembly method further comprises inserting the optical element through a fourth opening of a second reflective member to attach the second reflective member to the light source with the optical element after the attaching of the light source with the optical element to the first reflective member.

[23] In accordance with a preferred embodiment according to the display device assembly method mentioned above, the display device assembly method further comprises inserting the optical element through a fourth opening of a second reflective member to attach the second reflective member to the light source with the optical element before the attaching of the light source with the optical element to the first reflective member.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface. The terms "left" and "right" are used to indicate the "right" when referencing from the right side as viewed from the front of the display device, and the "left" when referencing from the left side as viewed from the front of the display device.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:

a display component;

a light source;

a support member supporting the light source;

an optical element positioned in a light emission direction from the light source; and a first reflective member positioned rearward of the display component, the first reflective member including a first opening and a second opening that is continuous with the first opening, with the light source being disposed in the second opening while the first reflective member is attached relative to the support member, and a width of the optical element being smaller than a width of the first opening and being larger than a width of the second opening in a first direction.

2. The display device according to claim 1, wherein the width of the second opening is larger than a width of the light source in the first direction.

3. A display device comprising:

a display component;

a light source;

an optical element positioned in a light emission direction from the light source; and a first reflective member positioned rearward of the display component, the first reflective member including a first opening and a second opening that is continuous with the first opening and in which the light source is positioned, and a width of the optical element being smaller than a width of the first opening and being larger than a width of the second opening in a first direction, the optical element including a plurality of legs, and the width of the second opening being larger than a distance between the legs in the first direction.

4. The display device according to claim 3, wherein the first opening and the second opening are continuous via a third opening, and the third opening having a width that is smaller than the distance between the legs in the first direction.

5. The display device according to claim 1, wherein the first opening and the second opening are linearly continuous.

6. The display device according to claim 1, wherein the first reflective member is formed by a reflective member having a shape corresponding to the support member.

7. The display device according to claim 1, wherein the light source and the optical element are each provided in a plural number, and the first reflective member includes a plurality of the first and second openings, directions in which the first and second openings are continuous substantially extend in a same direction.

8. The display device according to claim 1, further comprising a second reflective member overlapping with the first reflective member, and including a fourth opening through which the optical element is insertable.

9. The display device according to claim 8, wherein the first and second openings have an opening area that is larger than an opening area of the fourth opening.

10. The display device according to claim 8, wherein one of the first reflective member and the second reflective member has a larger reflection area than the other one of the first reflective member and the second reflective member.

11. The display device according to claim 10, wherein one of the first reflective member and the second reflective member is formed by a reflective member having a shape corresponding to the support member.

12. The display device according to claim 11, wherein the light source includes a plurality of light source groups in each of which a plurality of light sources are linearly arranged along an arrangement direction, the arrangement directions being different from each other, and the first reflective member is provided in a plural number corresponding to the light source groups.

13. The display device according to claim 1, further comprising a wiring board on which the light source is installed and that has a connector near an end, the first reflective member including an engagement hole through which the connector is insertable, and the engagement hole being disposed at a location where the connector is insertable into the engagement hole while the light source is disposed in the second opening.

14. The display device according to claim 1, wherein the second opening is disposed in a region where the optical element is disposed while the first reflective member is disposed relative to the support member.

15. The display device according to claim 8, wherein the fourth opening is disposed in a region where the optical element is disposed while the second reflective member is disposed relative to the support member.

16. The display device wherein a dimension of a bottom face of the support member is at least a sum of a dimension of a bottom face of the first reflective member and two times of a movement amount of the first reflective member relative to the light source to move the light source from the first opening to the second opening.

17. The display device according to claim 1, wherein a distance from one end of the optical element to one side of the first reflective member is substantially equal to a distance from the other end of the optical element to the other side of the first reflective member.

18. The display device according to claim 1, wherein the first direction is parallel to a reflection surface of the first reflective member and is perpendicular to a direction in which the first opening and the second opening are arranged.

19. A display device comprising:

a display component;

a light source;

a support member supporting the light source;

an optical element positioned in a light emission direction from the light source; and a first reflective member positioned rearward of the display component, the first reflective member including a first opening and a second opening that is continuous with the first opening, with the light source being disposed in the second opening while the first reflective member is attached relative to the support member, and the first opening having an opening area that is larger than an opening area of the second opening.

20. The display device according to claim 19, wherein a length of the second opening in a direction in which the first and second openings are continuous is smaller than a width of the optical element.

*21. A display device comprising:*

*a display component;*

*a light source;*

*a support member supporting the light source;*

*an optical element positioned in a light emission direction from the light source; and*

*a first reflective member positioned rearward of the display component,*

*the first reflective member including an opening, with the light source being disposed in the opening while the first reflective member is attached relative to the support member,*

*a width of the optical element being larger than a width of the opening in a first direction,*

*the optical element including a plurality of legs, and*

*the width of the opening being larger than a distance between the legs in the first direction.*

*22. The display device according to claim 21, wherein the width of the opening is larger than a width of the light source in the first direction.*

*23. The display device according to claim 21, wherein the first reflective member is formed by a reflective member having a shape corresponding to the support member.*

*24. The display device according to claim 21, wherein the light source and the optical element are each provided in a plural number, and the first reflective member includes a plurality of openings.*

*25. The display device according to claim 21, further comprising a second reflective member overlapping with the first reflective member.*

*26. The display device according to claim 25, wherein one of the first reflective member and the second reflective member has a larger reflection area than the other one of the first reflective member and the second reflective member.*

*27. The display device according to claim 26, wherein one of the first reflective member and the second reflective member is formed by a reflective member having a shape corresponding to the support member.*

*28. The display device according to claim 27, wherein the light source includes a plurality of light source groups in each of which a plurality of light sources are linearly arranged along an arrangement direction.*

*29. The display device according to claim 21, further comprising a wiring board on which the light source is installed and that has a connector near an end.*

*30. The display device according to claim 21, wherein the opening is disposed in a region where the optical element is disposed while the first reflective member is disposed relative to the support member.*

*31. The display device according to claim 21, wherein a distance from one end of the optical element to one side of the first reflective member is substantially equal to a distance from the other end of the optical element to the other side of the first reflective member.*

*32. The display device according to claim 21, wherein the first direction is parallel to a reflection surface of the first reflective member.*

*33. The display device according to claim 21, wherein the opening has an outer edge that is disposed at a location that overlaps with the optical member as viewed in a direction perpendicular to the display component.*

*34. The display device according to claim 21, wherein the opening has an outer edge that surrounds the light source and the legs.*

* * * * *